June 25, 1946.  H. B. HUBBLE  2,402,892
EDUCATIONAL DEVICE
Filed June 6, 1945

Inventor
H. Blair Hubble
By Frank C. Maley
Agent

Patented June 25, 1946

2,402,892

UNITED STATES PATENT OFFICE 2,402,892

EDUCATIONAL DEVICE

Henry Blair Hubble, Bucyrus, Ohio

Application June 6, 1945, Serial No. 597,791

5 Claims. (Cl. 35—31)

This invention relates to improvements in educational devices, particularly adapted for the teaching of children to count and to perform mathematical problems such as the addition of simple numbers.

The object of this invention is to simplify and improve teaching devices of this character which will train children in the art of counting and adding sums while they are playing, making the problems attractive and interesting, and yet easy to grasp the principles of counting and adding numbers so they will understand the principle involved therein.

This object may be accomplished according to one embodiment of the invention by the provision of a balancing device to be used with a series of blocks, such as the blocks ordinarily employed by children in playing and associating therewith numbered plates or other objects of successively different weights corresponding respectively with a predetermined number of blocks. For instance, the counterbalancing objects may consist of plates numbered consecutively from one to nine, while all of the blocks will be of uniform size and each corresponding in weight with the counterbalancing object designated "1." Then the child will learn that the weighing device will be balanced when the appropriate number of blocks are placed on the end of the scales opposite from the end on which one of the counterbalancing plates is disposed.

While the balancing mechanism may be varied as found, I have found particularly advantageous for use in this connection a beam scale construction which has weighing platforms supported on opposite ends of the beam which is pivotally supported midway of its length. It is preferable to use a pair of beams each pivotally mounted and connected with an upstanding support at the opposite ends thereof upon which the platforms are mounted and which, therefore, constitute a parallel motion device.

This form of the invention is shown in the accompanying drawing as the preferred embodiment thereof in which.

Figure 1:
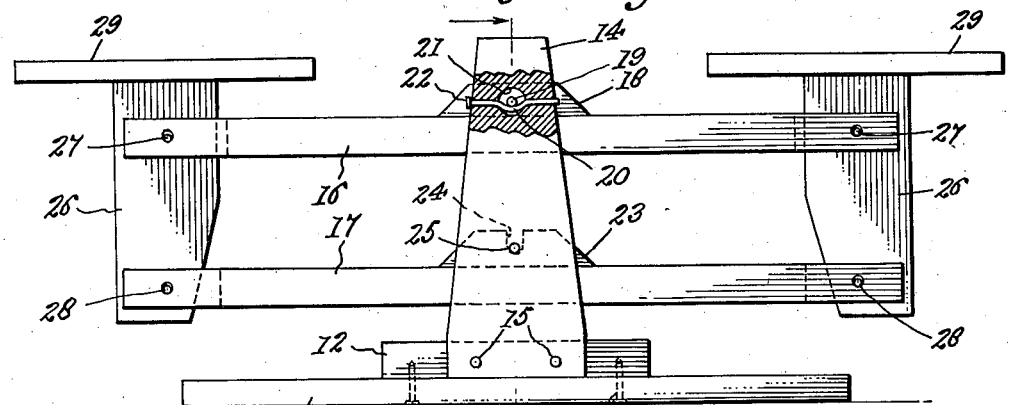
Fig. 1 is a side elevation of the scales, with a portion broken away and in section.
Figure 2:
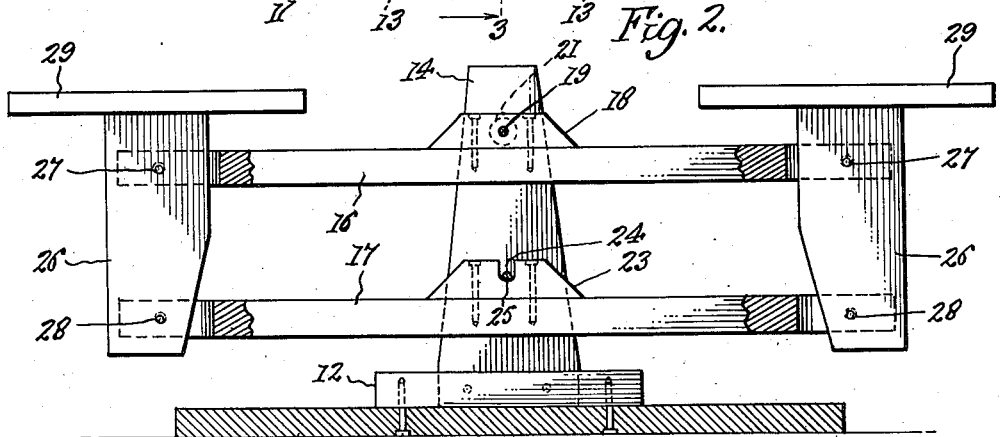
Fig. 2 is a partially vertical sectional view therethrough.

In the embodiment of the invention, as shown in the drawing, the invention is shown as constructed with beam scales having opposite platforms as an example of the application of this invention. The beam scales, however, should be of simple construction and, therefore, inexpensive to manufacture.

Figures 3, 4, 5:
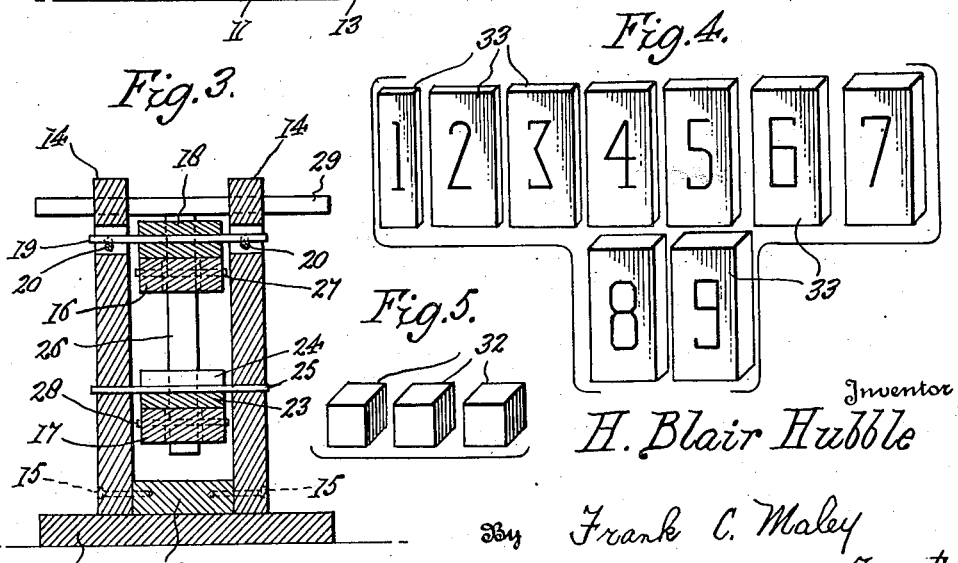
Fig. 3 is a cross section on the line 3—3 of Fig. 1.
Fig. 4 is a perspective view of a series of counterbalancing elements.
Fig. 5 is a similar view of a series of blocks.

I prefer to use beam scales constructed with a base 11 having a support 12 secured thereon as by fastenings 13. A pair of upstanding arms 14 embrace the support 12, as shown in Fig. 3, and are secured thereto by fastenings 15. These parts may be constructed of sheet metal, wood, fiber-board or other suitable light weight inexpensive material that may be found practical for the purpose. They constitute the supporting portion of the scales.

Mounted between the upstanding arms 14 are a pair of parallel beams 16 and 17, each of which is pivotally mounted intermediate its ends to the arms 14. The beam 16 has a bearing block 18 fixed on the upper surface thereof and through which extends a journal pin 19, preferably formed of wire or other suitable material. The opposite ends of the journal pin 19 are seated in bearings 20 fixed in the respective arms 14 in enlarged holes 21 therein. The bearings 20 are shown and preferably formed as concave seats in a supporting member such as a small nail 22, that is driven transversely through each arm 14 and through the opening 21 therein, with its intermediate portion bent to form the journal 20. This forms an inexpensive and yet freely acting journal for supporting the pivot pin 19 of the scale beam 16, allowing free tilting movement thereof.

The scale beam 17 is supported from the beam 16 as hereinafter described, but is provided with a journal intermediate the ends thereof. This journal is formed by a bearing block 23 formed with a notch 24 in the top edge thereof which receives a journal pin 25. The pin 25 extends transversely between the upstanding arms 14 and thus centers the beam 17 as well as guiding its tilting movements.

The beams 16 and 17 are connected together at opposite ends by upstanding supports 26, each of which is pivoted to the adjacent end of the beam 16 at 27 and to the adjacent end of the beam 17 at 28. The pivots 27 and 28 are spaced apart a distance equal the spacing of the pivots 19 and 25. Thus the supports 26 pivotally connect the corresponding ends of the beams 16 and 17 together and hold them in parallel relation for tilting movements. The supports 26 project upward from the beam 16 and have platforms 29 mounted on the upper ends thereof, This constitutes a novel and yet simple and inexpensive form of scales which may be used as a part of this educational device and will act effectively in carrying out the principle here involved of teaching a child to count and to add numbers.

The invention contemplates the use with the scales described above, or other form of weighing device as desired, of a series of blocks of uniform size, some of which are represented in Fig. 5 and designated at 32. These blocks may be generally in the form of a cube or of other shape as desired and preferably are somewhat smaller than the conventional child's playing blocks.

A series of counterbalancing elements are shown at 33 in Fig. 4. Each of these elements 33 is illustrated as formed substantially in the shape of a small plate, although any other shape may be used as desired, and preferably carry thereon indicia to represent respective numbers. In the form shown these are numbered successively from 1 to 9. The elements 33 should be constructed also of successively different weights corresponding with multiples of the first element designated "1" and which should be equal in weight with one of the blocks 32. Therefore, the successive elements 33 would correspond in weight respectively with one, two, three, etc., of the blocks 32, up to nine of the blocks if nine of the weighing elements are used in the set.

The educational process is carried out according to this invention by using the elements 33 to teach the child the numbers from one to nine, for instance. The different sizes and weights of these elements which can be detected and appreciated by the child will aid materially in the teaching process.

Then when the child has learned the numbers accordingly, the equipment may be used in teaching the child the addition of numbers. This is done by placing the weighing element 33, that is designated "1" on one of the platforms 29, and one of the blocks 32 on the other platform 29 to show that these are equal. Then when the weighing element that is designated "4" is placed on a platform 29, the child will learn that it takes four of the blocks 32 to counterbalance this element, and that it takes two and two blocks to equal four, or three plus one block to equal four. Likewise, the numbered elements 33 may be used on respective opposite ends of the scales. For instance, the child may be taught that the blocks designated "1" and "2" when placed on one end of the scales will counterbalance the element "3" placed on the other end, thereby learning that two plus one equals three, by seeing that they balance when used in this relation. In a like manner, the blocks "4" and "2" will balance the block "6," thereby learning that four plus two equal six. In a similar manner, other numbers of addition or subtraction may be taught to the child by observing the effects of placing respective blocks and weighing elements on the opposite platforms.

Thus an educational device is provided which may be used effectively to teach a child numbers and the addition of numbers or the subtraction thereof while the child is playing, presenting the information in an interesting manner. Nevertheless, the entire construction may be made inexpensively, the major portion of the parts being formed of wood, wallboard, or the like, which will, nevertheless, be effective for the purpose.

I claim:

1. An educational device comprising platform scales having spaced counterbalancing platforms, and a plurality of elements consecutively numbered and corresponding respectively in weight with respective multiples of a given unit of weight, whereby one unit placed on one platform having a multiple of the weight units will balance a plurality of elements placed on the other platform which jointly equal said weight units as correspondingly indicated thereon.

2. An educational device comprising scales having a beam pivotally supported intermediate the length thereof with platforms adjacent opposite ends of the beam and supported thereon, and a plurality of counterbalancing elements adapted to be placed on the platforms in different multiples, and consecutively numbered to indicate the value of the respective elements, the elements being of respectively different weights corresponding in multiples to a given unit of weight with the numbers contained thereon.

3. An educational device comprising scales having a beam pivotally supported intermediate the length thereof with platforms adjacent opposite ends of the beam and supported thereon, a second beam extending parallel with the first-mentioned beam and pivotally mounted intermediate the ends thereof, means holding the beams in parallel relation, and a plurality of counterbalancing elements adapted to be placed on the platforms in different multiples and consecutively numbered to indicate the value of the respective elements, the elements being of respectively different weights corresponding in multiples to a given unit of weight with the numbers contained thereon.

4. In an educational device, scales comprising upstanding supporting arms, a support for said arms, a beam extending between the arms, a pivot pin connected with the beam, each of said arms having an enlarged opening receiving an end of said pivot pin, and means extending transversely through the opening and having a depressed seat therein forming a journal supporting an end of the pivot pin in the arm.

5. In an educational device, scales comprising upstanding supporting arms, a support for said arms, a beam extending between the arms, a pivot pin connected with the beam, each of said arms having an enlarged opening receiving an end of said pivot pin, means extending transversely through the opening and having a depressed seat therein forming a journal supporting an end of the pivot pin in the arm, a second beam extending between the arms, means pivotally connecting the second beam with the arms, upstanding supports at opposite ends of the beams and each pivotally connected with the beams and holding said beams in parallel relation, and a platform mounted on each of the supports.

HENRY BLAIR HUBBLE.